Jan. 26, 1965 R. W. BROWN 3,166,963
STOCK REEL

Filed Sept. 11, 1961 5 Sheets-Sheet 1

Inventor
Roger W. Brown
By Lindsey, Prutzman and Hayes
Attys

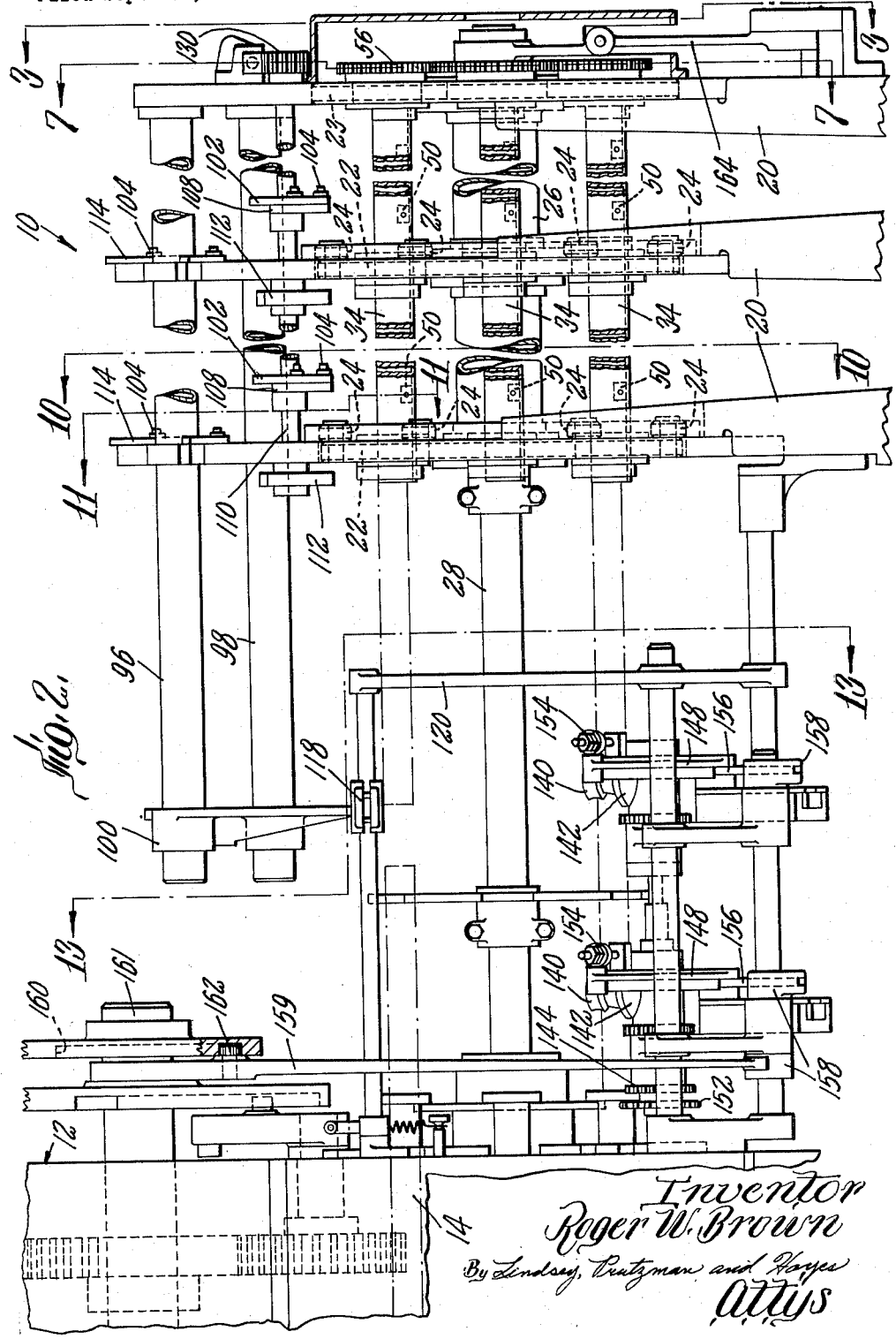

Jan. 26, 1965     R. W. BROWN     3,166,963
STOCK REEL
Filed Sept. 11, 1961     5 Sheets-Sheet 3
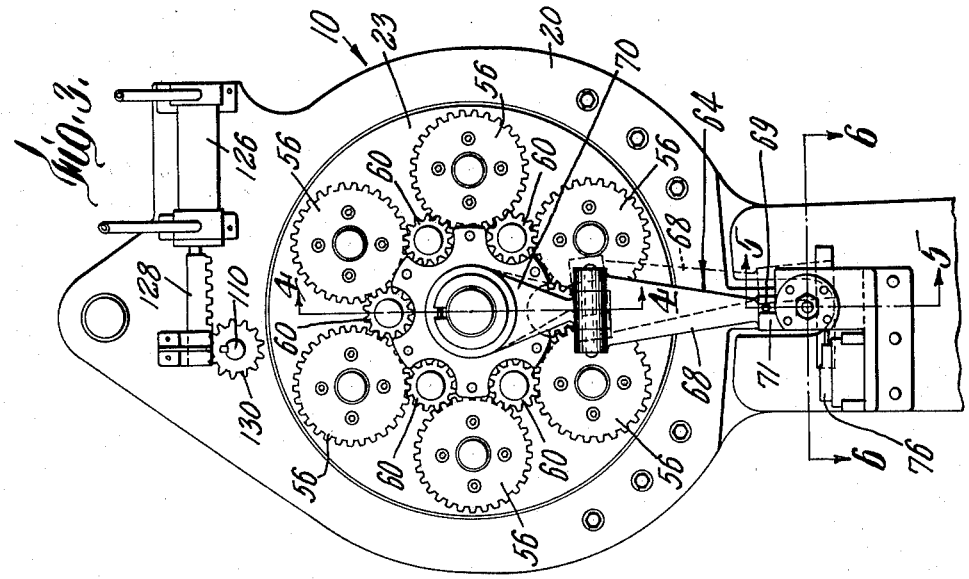
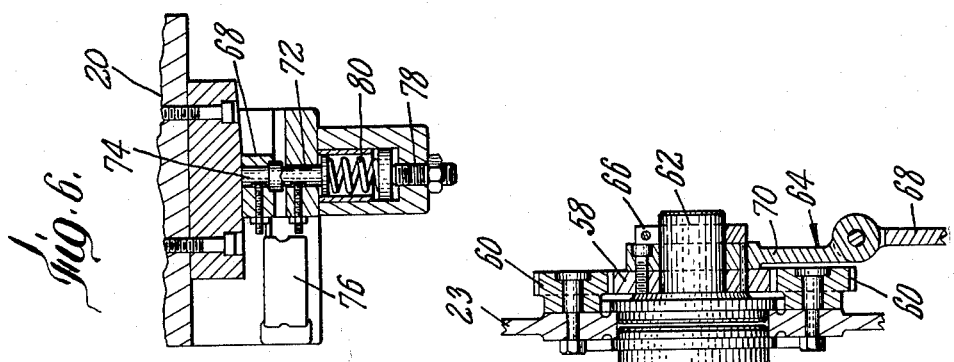
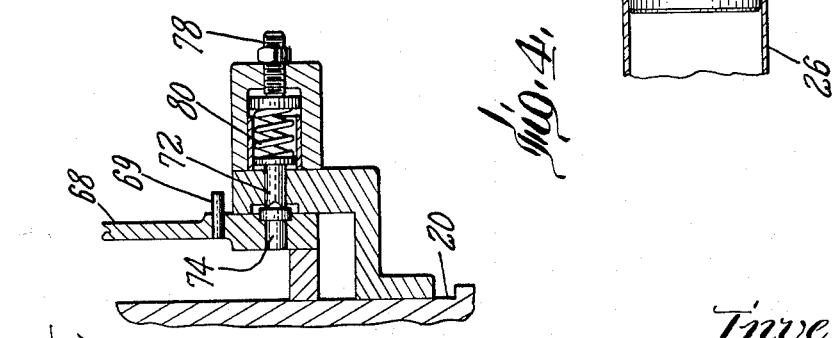
Inventor
Roger W. Brown
By Lindsey, Brutzman and Hayes
Attys

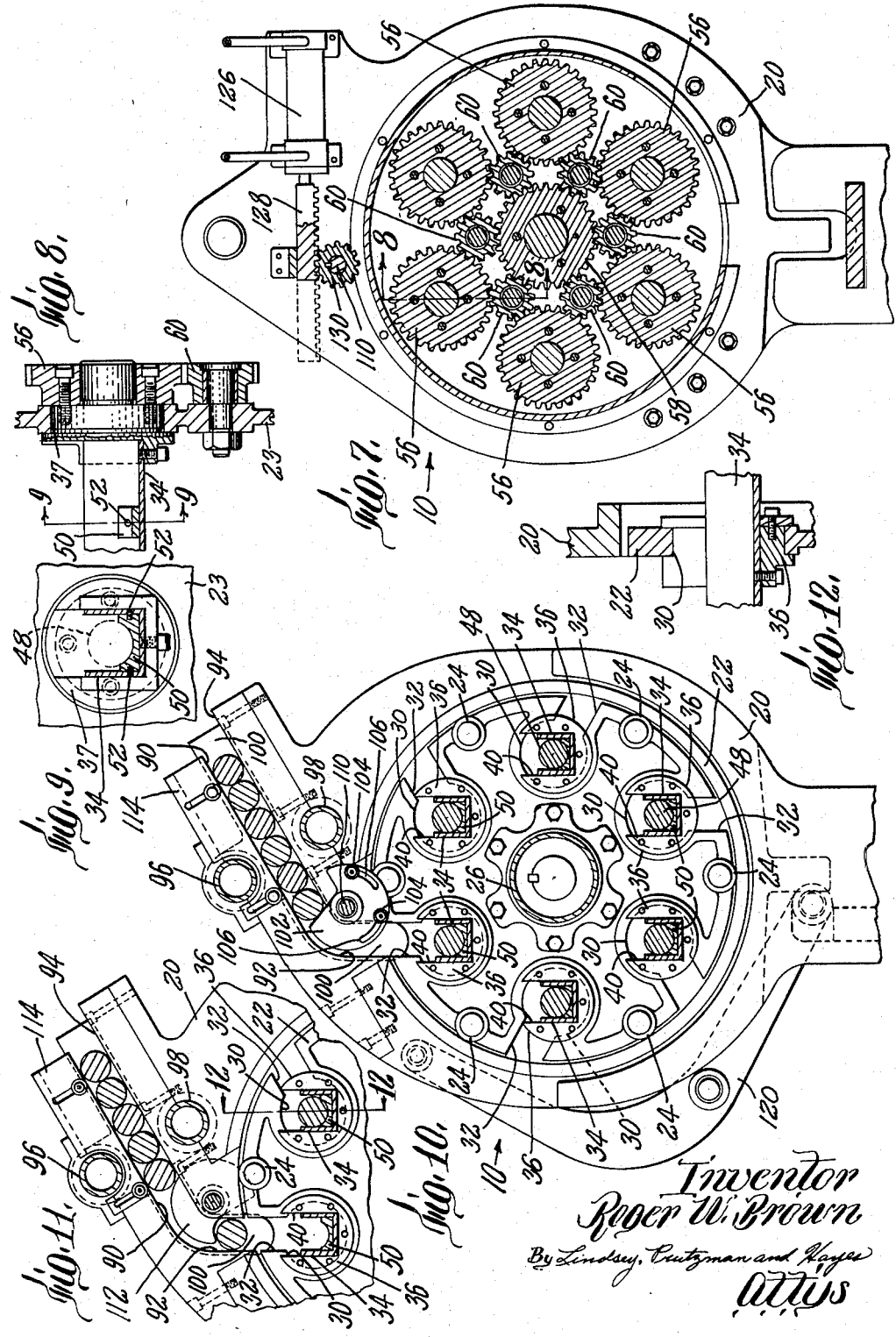

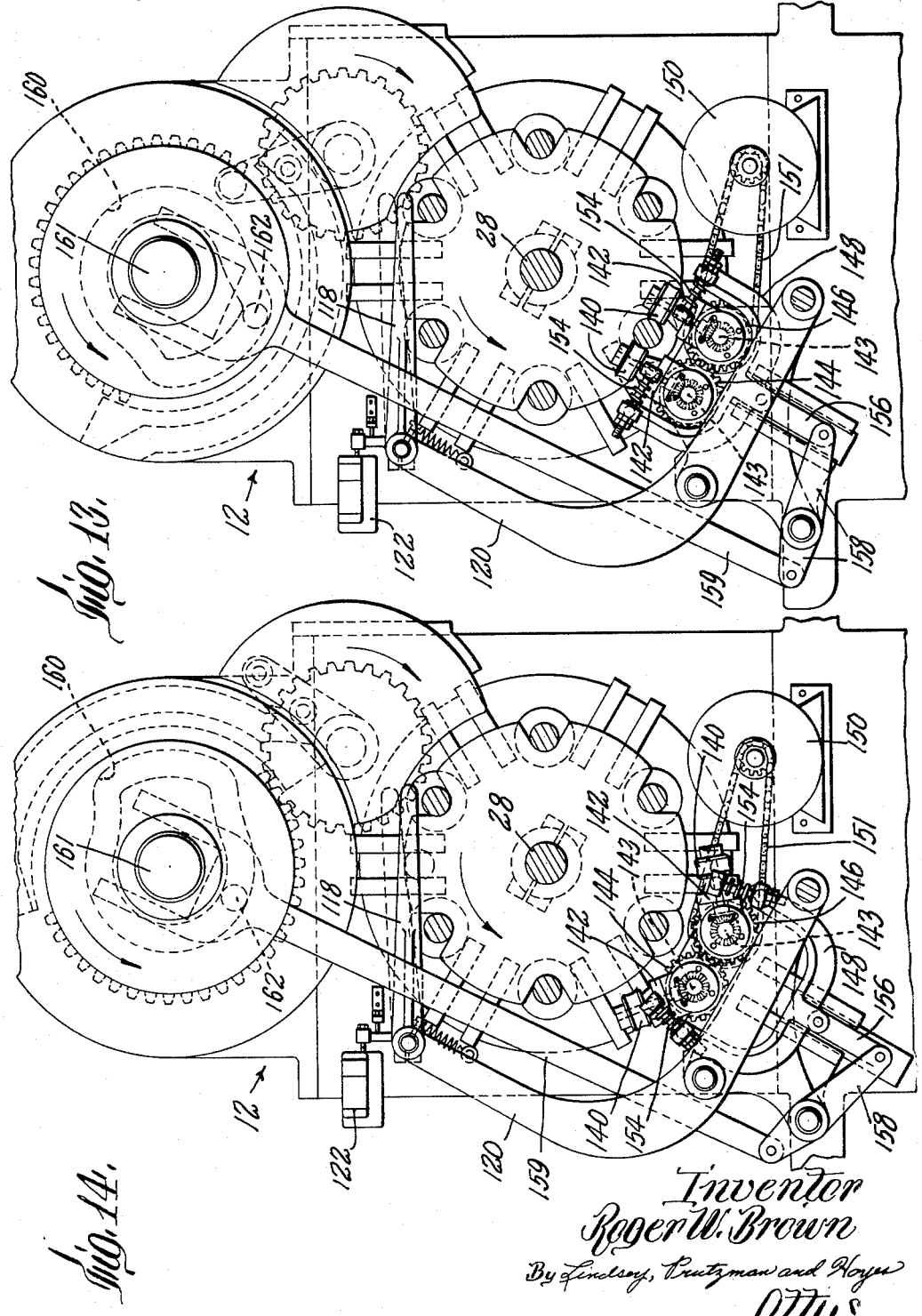

United States Patent Office 3,166,963
Patented Jan. 26, 1965

3,166,963
STOCK REEL
Roger W. Brown, Windsor, Vt., assignor to Pneumo
Dynamics Corporation, Cleveland, Ohio, a corporation
of Delaware
Filed Sept. 11, 1961, Ser. No. 137,212
7 Claims. (Cl. 82—38)

This invention relates to stock reels having particular utility for feeding stock to multiple spindle lathes.

It is a principal object of this invention to provide a new and improved stock reel for use with a multiple spindle lathe wherein the stock can be automatically fed from a stock magazine into accurate alignment with the lathe spindles as the stock is used up, and which provides this automatic feeding within a minimum of space and with maximum efficiency and reliability.

It is another object of this invention to provide a new and improved stock reel which is readily adaptable for a variety of sizes of stock for maintaining each size of stock in proper alignment with the lathe spindles during the complete machining cycle so as to eliminate all whipping or other undesirable stock movement.

It is a further object of this invention to provide an improved stock reel which automatically terminates its operation or otherwise signals the machine operator when the stock is improperly located in the reel.

It is another object of this invention to provide an improved stock reel which has a simple arrangement of parts that are readily accessible for adjustment or maintenance and which give reliable operation over a long period of time.

Other objects will be in part obvious, and in part pointed out more in detail hereinafter.

The invention accordingly consists in the features of construction, combination of elements and arrangement of parts which will be exemplified in the construction hereafter set forth, and the scope of the application which will be indicated in the appended claims.

In the drawings:

FIG. 2 is an enlarged fragmentary side elevation view of the stock reel and lathe of FIG. 1;

FIG. 3 is a transverse sectional view taken substantially along the line 3—3 of FIG. 2;

FIG. 4 is an enlarged fragmentary cross section view taken substantially along the line 4—4 of FIG. 3;

FIG. 5 is an enlarged fragmentary cross section view taken substantially along the line 5—5 of FIG. 3;

FIG. 6 is an enlarged fragmentary cross section view taken substantially along the line 6—6 of FIG. 3;

FIG. 7 is a transverse sectional view taken substantially along the line 7—7 of FIG. 2;

FIG. 8 is an enlarged fragmentary cross section view taken substantially along the line 8—8 of FIG. 7;

FIG. 9 is a fragmentary sectional view taken substantially along the line 9—9 of FIG. 8;

FIG. 10 is a fragmentary sectional view taken substantially along the line 10—10 of FIG. 2;

FIG. 11 is a fragmentary sectional view taken substantially along the line 11—11 of FIG. 2;

FIG. 12 is an enlarged fragmentary cross section view taken substantially along the line 12—12 of FIG. 11;

FIG. 13 is a fragmentary sectional view taken substantially along the line 13—13 of FIG. 2 showing the lathe stock feed mechanism in a feeding position; and FIG. 14 is a fragmentary sectional view similar to FIG. 13 showing the stock feed mechanism in a non-feed position.

Figure 1:
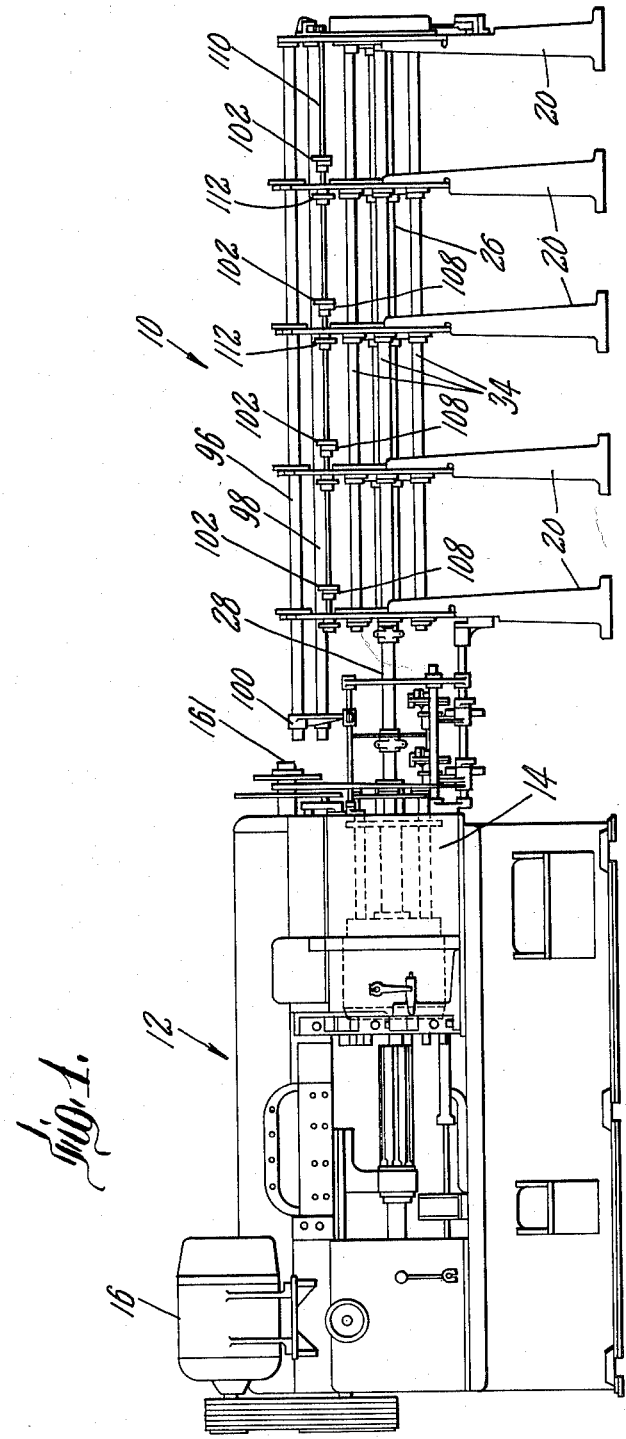
FIG. 1 is a side elevation view of a stock reel of this invention shown in operational association with a conventional multiple spindle lathe.

Referring now to the figures in detail, the stock reel of this invention is generally designated by the numeral 10 and is shown in operational association with a conventional multi-spindle lathe 12 having the usual upright column 14 in which there is rotatably mounted a spindle carrier having a plurality of spindle and collet assemblies used for supporting the lathe stock during the lathe machining operations. The spindle and collet assemblies are conventionally driven by an electric motor 16 and, in the well-known manner, the spindle carrier is periodically indexed counterclockwise, as seen from the reel end of the lathe, to move the spindle supported work pieces to the various machining stations.

The stock reel 10 is aligned with the longitudinal axis of the lathe 12 upon a reel base including a plurality of standards 20, the outer one of which rotatably supports a circular disc or stock carrier 23, with the remaining standards rotatably supporting in alignment therewith a plurality of stock carriers or discs 22 by means of a number of rollers 24 (FIG. 10) mounted on each carrier 22. The discs 22 and 23 are rigidly connected for simultaneous rotation by means of a central tube 26, and are fixed to the spindle carrier by means of a bar 28 so that they are indexed simultaneously with the spindle carrier.

For supporting the stock within the stock reel, there are provided in the discs 22 a plurality of angularly spaced stock receiving openings 30 (FIG. 10) that are aligned with the lathe spindles. U-shaped channel members or stock supporting enclosures 34 having elongated stock receiving openings on one side thereof extend through the openings 30 and are rotatably supported therein by bearing assemblies 36 (FIG. 12) and are additionally rotatably supported on the end disc 23 by similar bearing assemblies 37 (FIG. 8). Each of the bearing assemblies 36 has a slot 40 extending from the side openings in the stock supports 34 and each one of the openings 30 is connected with a feed slot 32 that opens into the periphery of the discs so as to allow transverse leading of the stock when the bearing slots 40 are aligned with the disc slots 32. As best seen in FIGS. 9 and 10, the stock 48 is supported within the stock supports 34 upon a plurality of spaced blocks 50 that are affixed within the channel members by set screws 52. As it is desirable to have the longitudinal axis of the stock 48 in the exact alignment with the axis of the lathe carrier spindles, the blocks 50 are positioned between the standards 20 so that they may be readily replaced by blocks appropriately dimensioned for supporting the size of stock to be fed to the lathe. Accordingly, when the lathe stock size is changed it is only necessary to replace these blocks 50.

The stock supports 34 are maintained upright with their open sides facing upwardly during a complete revolution of the discs 22 and 23 so that the stock under its own weight will remain upon the support blocks 50 and thereby remain in proper axial alignment with the lathe spindles throughout the entire machining cycle. Maintaining the stock supports upright is accomplished through a gear arrangement, best shown in FIGS. 3, 4, 7 and 8 wherein each of the bearings 37 in the end disc 23 has fixed thereto a torque transmitting gear 56 that is drivingly connected with a central normally stationary torque transmitting gear 58 through a plurality of intermediate torque transmitting pinion gears 60 rotatably mounted on the disc 23. The number of teeth on the gears 56 and 58 are selected so that the U-shaped supports 34 remain upright, such being accomplished in the particular gear arrangement shown when the number of teeth on these gears are equal. Referring to FIG. 4, the gear 58 is fixed to an upper arm portion 70 of a two-part arm 64 and is rotatably mounted coaxially with the carrier 23 upon an extension 62 of the reel and retained thereon by a split ring 66. The two-part arm 64 has a lower arm portion 68 that is pivotally supported to the upper arm portion 70 about an axis extending perpendicular to the longitudinal axis of the arm and is normally positioned so that an outwardly extending pin abutment 69 (FIG. 3) on the lower arm 68 is in engagement with a stop 71. The arm is retained against counterclockwise movement, as seen in FIG. 3, by means of a safety lock providing a frictional engagement between a tapered retaining pin 72 slidably supported upon the end standard 20 and partially received within a tapered recess in an anvil 74 that is fixed within the lower arm portion 68. The degree of frictional engagement between the pin 72 and the anvil 74 is determined by a spring 80 which urges the pin 72 against the anvil 74, such engagement being adjustable by means of a screw 78.

If the stock supports 34 are jammed against rotation relative to the discs 22 and 23 as, for example, if the stock were lodged within the U-shaped support and within the feed opening 32, a counterclockwise torque would be caused on the central gear 58 as the stock carrier 22 is indexed and this torque would move the anvil 74 out of engagement with the retaining pin 72, as shown in phantom in FIG. 3. For providing a signal to the lathe operator when such jamming or malfunctioning occurs, an electrical switch 76 is located so as to be actuated by the arm 68 when that arm is in its normal position with the retaining pin 72 engaging the anvil 74 and which becomes released when the arm 68 moves counterclockwise. This switch 76 may then be used to initiate a signal such as an alarm when jamming occurs, or used to break the electrical circuit to the lathe motor 16 and thereby prevent possible damage to the lathe or reel parts.

A stock magazine is provided above the stock supports 34 upon the standards 20 by the provision of chutes 90 (FIGS. 10 and 11) having vertically extending portions 92 at the lower ends thereof adapted for connection with the feed slots 32 and the bearing slots 40 when the stock supports 34 are indexed to a loading station, here shown to be the station located in the eleven o'clock position. The magazine has a chute portion 94 extending at an angle of approximately 30° with the horizontal which is of sufficient length to support a number of pieces of stock. A pair of tubular members 96 and 98 are rigidly connected to each of the standards 20 adjacent the chutes 90 and adjustably support adjacent the lathe 12 a stock guide or stop 100 (FIGS. 1 and 2) which engages the end of the magazine stock to maintain it in the proper longitudinal position. The stock is retained within the magazine by retaining or locking cams 102 (FIG. 10) which are adjustably fixed to a magazine feed control shaft 110 by a pair of screws 104 extending through the locking cam slots 106 and threaded into the shaft collars 108 (FIG. 2). Also fixed to the feed control shaft 110 are a plurality of pick-up or feed cams 112 (FIG. 11) which are adapted when the shaft 110 is moved counterclockwise, as seen in FIG. 10, to pick up a single piece of lathe stock in the magazine and deliver it to the vertical chute portion 92 whereupon it falls by gravity upon the waiting stock support 34. In order that the same magazine may be useful for various lathe stock sizes, an adjustable plate 114 is provided for maintaining the stock against the lower surface of the chute portion 94. When a different size stock is used, the plate 114 is appropriately adjusted, and the retaining cam 102 is adjusted upon the collar 108 to ensure that only a single piece of lathe stock is transferred from the magazine to the channel support upon movement of the feed control shaft 110.

To provide automatic feed of the stock from the magazine to the stock supports when those supports become empty there is provided a sensing arm 118 (FIGS. 13 and 14) pivotally supported upon a fixed arm 120 and adapted to engage the stock extending between the reel and the lathe beneath the magazine guide 100. When the stock in a particular stock support 34 has been fed into the lathe so that its outer end is not engaged by the sensing arm 118 as the stock support is indexed to the eleven o'clock position, the arm 118 will not be pivoted upwardly from engagement with the stock, and a switch 122 that is normally actuated by the sensing arm 118 for opening a feed circuit (not shown) remains closed. With the feed circuit closed, a lathe operated switch (not shown) that is operated in timed relation with the indexing of the lathe energizes the feed circuit to control through appropriate means (not shown) a hydraulic cylinder 126 (FIG. 3) for moving a piston supported rack 128 to the left as seen in FIGS. 3 and 7 thereby rotating the pinion 130 and shaft 110 so as to transfer a piece of stock to the empty stock support 34. Subsequently, the feed circuit controls the return of the hydraulic cylinder 126 for moving the rack 128 and shaft 110 to their initial positions.

Referring to FIGS. 2, 13 and 14, after the reel has been indexed to move the stock to the seven o'clock position, as seen in FIGS. 13 and 14, two pair of housings 142 are pivoted about their axes 143 from a first retracted position, shown in FIG. 14, to a second position, shown in FIG. 13, where their rotatably supported feed rollers 140 engage the lathe stock. The feed rollers 140 are continuously driven by a motor 150 and chain 151 through a sprocket 152 (FIG. 2), a pair of mating spur gears 144 and 146 and suitable gearing provided within the housings 142. The housings 142 are pivoted about their axes 143 by a yoke 148 that is connected thereto through the compression springs 154, and the yoke in turn is driven by a link 156, a bell crank 158 and a link 159. The upper end of the link 159 is slidably mounted on the main drum shaft 161 and carries a cam follower 162 that is received within a cam slot 160 to move the link 159 and thereby move the feed rollers 140 in and out of engagement with the lathe stock in proper timed relationship with the indexing of the stock reel. Therefore, as each piece of stock is indexed to the seven o'clock position, it is fed by the feed rollers toward the aligned lathe carrier spindle.

It can be seen that the stock reel of this invention is readily adjustable for feeding stocks of all sizes and is fully automatic in coordinating the feed of the stock from a stock magazine to the lathe as the stock is being consumed thereby. Additionally, the stock reel firmly supports the stock of any selected size in proper alignment with the lathe spindle throughout the entire lathe operation and automatically signals the operator as by shutting down the lathe when the stock is improperly positioned in the reel.

As will be apparent to persons skilled in the art, various modifications and adaptations of the structure above described will become readily apparent without departure from the spirit and scope of the invention, the scope of which is defined in the appended claims.

I claim:

1. A stock reel comprising a reel base, a stock carrier rotatably mounted upon said reel base, a plurality of generally U-shaped upright stock supporting members rotatably mounted on the stock carrier for movement about axes lying parallel to the axis of rotation of the stock carrier, first torque transmitting means fixed to the stock supporting members, and means connected to said first torque transmitting means maintaining the stock supporting members upright during rotation of the stock carrier whereby the stock is maintained by its own weight in engagement with the stock supporting members during a complete revolution of the stock carrier.

2. A stock reel comprising a reel base, a stock carrier rotatably mounted upon the reel base, a plurality of generally U-shaped upright stock supports rotatably mounted upon the stock carrier for movement about axes lying parallel to the carrier axis, first gears fixed to the stock supports, a second normally stationary gear rotatably mounted for movement about the stock carrier axis, and intermediate gears transmitting torque between the first and second gears maintaining the stock supports upright during rotational movement of the stock carrier whereby the stock is maintained by its own weight upon the stock supports throughout a complete revolution of the stock carrier.

3. For use with a multiple spindle lathe having an electrical motor driving an indexable rotatably mounted spindle carrier with a plurality of stock receiving spindles therein, a stock reel comprising: a reel base, a stock carrier rotatably mounted upon the reel base about an axis coaxial with the spindle carrier axis, a plurality of stock supports rotatably mounted on the stock carrier for movement about axes lying parallel to the spindle carrier axis and aligned with the stock receiving spindles, first torque transmitting means fixed to the stock supports, a second normally stationary torque transmitting means, a third torque transmitting means connecting said first and second torque transmitting means and maintaining the stock supports upright during rotation of the stock carrier, locking means restraining the normally stationary second torque transmitting means against movement, said locking means being releasable upon excessive torque being applied to one of said torque transmitting means, and switching means responsive to movement of the second torque transmitting means deenergizing the lathe motor whereby excessive torque on the first torque transmitting means will shut down the lathe.

4. For use with a multiple spindle lathe having an electrical motor driving an indexible rotatably mounted spindle carrier with a plurality of stock-receiving spindles therein, a stock reel comprising: a reel base, a stock carrier rotatably mounted upon the reel base about an axis coaxial with the spindle carrier axis, a plurality of U-shaped stock supports rotatably mounted on the stock carriers for movement about axes lying parallel to the spindle carrier axis and aligned with the stock-receiving spindles, first gears fixed to the stock supports, a second normally stationary gear having a number of teeth equal to the number of teeth on the first gears and mounted for rotatable movement about the carrier axis, third pinion gears interconnecting said first gears and said second gear, an elongated arm fixed to said second gear having a recessed portion on the outer end thereof, a slidably mounted retaining pin having one end normally received within said recess in the arm, means urging the pin toward said arm, and switching means responsive to movement of the arm out of its normal position de-energizing the lathe motor drive whereby excessive torque on the second gear will shut down the lathe.

5. A stock reel comprising, a reel base, a stock carrier rotatably mounted on the base, a plurality of generally U-shaped upright stock supporting members rotatably mounted upon the stock carrier for movement about axes lying parallel to the carrier axis, means maintaining the stock supporting members upright during movement of the stock carrier, a stock magazine having a magazine chute positioned for feeding stock to the stock supporting members when they are moved to a particular position relative to the carrier axis, a feed control shaft extending parallel to the carrier axis having feed and locking cams thereon adapted for engagement with stock within the magazine chute, said locking cam being angularly adjustable upon said shaft, means for sensing an empty stock supporting member, and control means operated by said sensing means moving said shaft to feed a piece of stock from the magazine into the empty stock support when it is moved to said particular position relative to the carrier axis.

6. For use with a multiple spindle lathe having an indexable rotatably mounted spindle carrier with a plurality of stock-receiving spindles therein, a stock reel comprising, a reel base, a stock carrier rotatably mounted upon said reel base about an axis coaxial with the spindle carrier axis, a plurality of upright stock supporting enclosures rotatably mounted on the stock carrier for movement about axes lying parallel to the axis of rotation of the stock carrier and aligned with the stock-receiving spindles, said stock-supporting enclosures having openings therein permitting transverse feeding of the stock thereto, and means maintaining the stock-supporting enclosures upright during rotation of the stock carrier whereby the stock is maintained by its own weight in engagement with the stock-supporting enclosures throughout a complete revolution of the stock carrier.

7. For use with a multiple spindle lathe having an indexable rotatably mounted spindle carrier with a plurality of stock-receiving spindles therein, a stock reel comprising, a reel base, a stock carrier rotatably mounted on the reel base about an axis coaxial with the spindle carrier axis, a plurality of upright stock-supporting enclosures rotatably mounted upon the stock carrier for movement about axes lying parallel to the axis of rotation of the stock carrier and aligned with the stock-receiving spindles, said stock-supporting enclosures having openings therein for permitting transverse feeding of the stock thereto, first torque transmitting means fixed to the stock-supporting enclosures, a normally stationary second torque transmitting means, third torque transmitting means connecting said first and second torque transmitting means and maintaining the elongated stock-supporting enclosures upright during rotation of the stock carrier, and locking means restraining the normally stationary second torque transmitting means against movement, said locking means being releasable upon excessive torque being applied to one of said torque transmitting means.

References Cited in the file of this patent

UNITED STATES PATENTS

| | | |
|---|---|---|
| 1,905,476 | Lorenz | Apr. 25, 1933 |
| 1,963,032 | Rupple | June 12, 1934 |
| 2,646,087 | Jobert | July 21, 1953 |
| 2,953,069 | Smith | Sept. 20, 1960 |
| 3,010,605 | Jones | Nov. 28, 1961 |